Nov. 21, 1939.   R. H. BEACH   2,181,042

ELECTRIC HEATING DEVICE

Filed Aug. 7, 1937

INVENTOR.
RALPH H. BEACH
BY
ATTORNEYS

Patented Nov. 21, 1939

2,181,042

UNITED STATES PATENT OFFICE 2,181,042

ELECTRIC HEATING DEVICE

Ralph H. Beach, Ann Arbor, Mich.

Application August 7, 1937, Serial No. 157,974

9 Claims. (Cl. 219—25)

The present invention, constituting a further development of that shown in my copending application Serial No. 23,616, filed May 27, 1935, relates to electrically heated devices of the cordless variety; that is, containing a heating element to which connection is made only when the device rests upon a stand provided with contacts engageable by cooperating contacts on the device. While disclosed in connection with a pressing iron, the principles of the invention will be seen to be readily applicable to other electrically heated appliances, such, for example, as chafing dishes, frying or cooking pans and the like.

Cordless electric irons present problems of especial difficulty. They must incorporate a heating element of relatively large size, since sufficient heat must be generated during those intervals in which the user must put the iron down to maintain the iron at proper ironing temperature, even though the iron is only placed on the stand for relatively short periods, as, for example, while the user folds the cloth being worked upon, or removes it from the board to replace it with new work.

I have found that a heating element of the order of at least 1300 watts is required to accomplish this purpose, and the problems involved in connection with handling such heavy currents by means of simple and compact switching means are of course complicated by the high temperatures developed by the iron, making it difficult to maintain the characteristics of thermostatic and spring materials. These considerations make it advisable that the switching and thermostat means be carried by the stand rather than located within the iron itself. Additional difficulties present themselves, however, when one attempts to locate the thermostat outside such an iron of the cordless type, because the large heating element employed develops high temperatures so rapidly, and cools so slowly, that it is difficult to provide a thermostat which will respond promptly and accurately enough to prevent overheating of the iron, when the iron reaches a desired temperature while on the stand, and which similarly will respond very quickly to replacement of the iron upon the stand while still at the ironing temperature (since the thermostat cools while the iron is off the stand). Likewise the thermostat must be affected solely by the temperature of the iron, in order that it may respond quickly enough to prevent undue cooling in the periods during which the current is off.

As disclosed in the aforementioned copending application, the enumerated difficulties are met by providing a thermostat which, although carried by the stand, is so located that it constitutes a support for the iron, while the heat of the iron must pass through the thermostat before it can reach the stand, assuring positive actuation of the thermostat and preventing any interference with prompt thermostat response due to the large heat dissipating capacity of the stand. This sensitive response of the thermostat is assisted further by allowing only very limited heat conduction between the iron and the stand, and between the thermostat and the stand. The present invention aims to improve upon the construction therein disclosed by so arranging the thermostat that although it acts as a support to maintain the iron spaced above the stand, the weight of the iron cannot stress the bi-metal or other thermostatic material, or otherwise interfere with its movement and accuracy.

To provide for adjustment of the temperature at which the thermostat actuates the control switch, the present invention also aims to incorporate improved regulating means, involving no bodily movement of the switch, or looseness in its mounting, or looseness in the mounting of the thermostat. Any play or lost motion, or ability of the switch or thermostat to move with relation to its support, by allowing the switch to "follow" the thermostat, reduces the ability of the switch to respond instantly to the slightest warping of the thermostat. Since a lag of but a very few seconds is capable of causing overheating of such a cordless iron incorporating a heavy heating element, the matter of maintenance of sensitivity and of adjustment requires relatively heavy and extremely accurate (and accordingly expensive) construction in event movable supporting means for either the switch or the thermostat is provided, whereas in the improved construction herein disclosed, rigidity and sensitivity is maintained in a very ample and inexpensive manner.

Another object of the invention is, therefore, to provide such an iron incorporating improved switching means constructed in accordance with the invention in my copending application, Serial No. 23,616, but wherein the switching means is rigidly fixed to the base or stand of the iron, in such manner that any rocking or play thereof is impossible, and in conjunction with the installation of which there is provided very simple and inexpensive adjusting means for regulating the temperature at which the iron is turned on and off.

Figure 1:
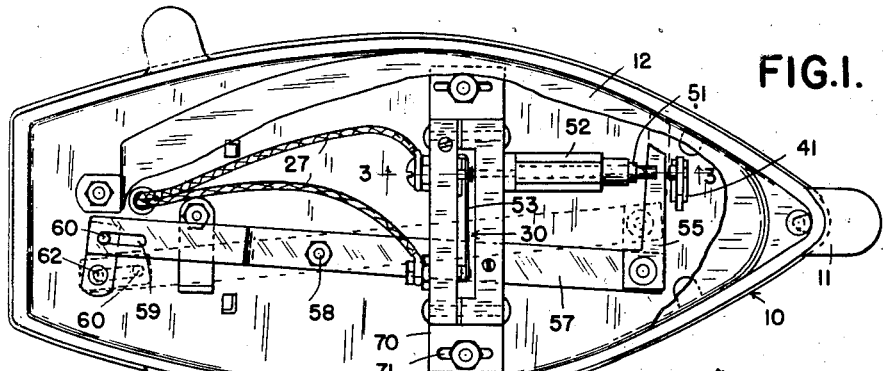
Figure 1 is a bottom plan view of the controlling and supporting stand portion of an iron and control assembly incorporating the principles of this invention, with the cover plate partly broken away.

Referring now to the drawing, reference character 10 designates a sheet metal stand, which in plan may conform generally to the shape of the iron, although it is elongated at the back to carry the terminal and contact block assembly generally designated 15. Feet 11 hold the stand spaced above the supporting surface, and the switch mechanism is arranged in the space beneath the stand and enclosed by a cover 12, between the edges of which and the bottom of the stand openings as 13 are preferably provided for air circulation.

Projecting outwardly and downwardly from the back of the iron 20 are rigid contact posts 22, guarded by a hood 24 and adapted to enter openings as 26 in the contact block assembly, and to rest upon contacts as 23 therein, through which, and the posts 22, current is supplied to the iron, the cord 25, containing the feed wires, which is of course adapted to be connected to any suitable source of current, entering the contact block assembly from the rear.

One wire of the cord 25 is directly connected to one of the contacts 23, while the switch 30 is connected in series with the other contact 23 and the other wire of the cord 25, as by means of the wires 27.

Figure 2:
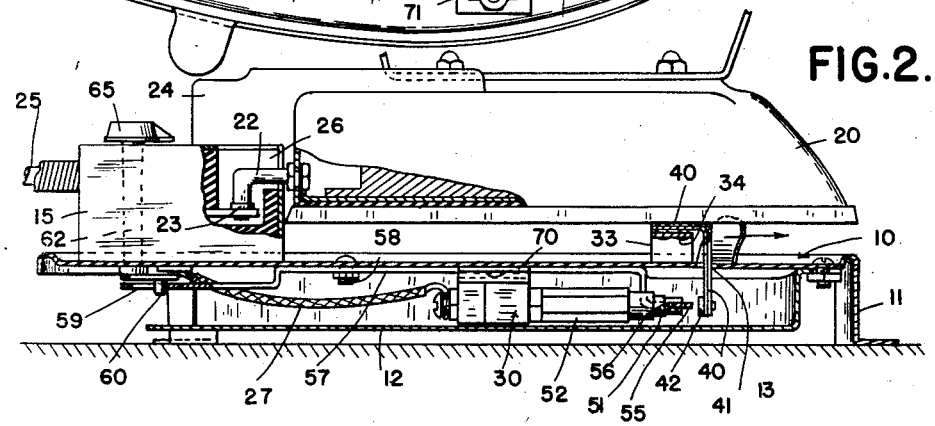
Figure 2 is a view of the stand partly in side elevation and partly in longitudinal section, fragmentarily showing an iron in place thereon.
Figures 3, 4, 6:
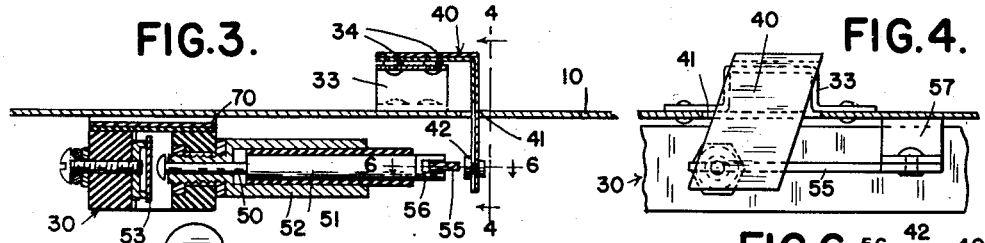
Figure 3 is a detailed sectional view of the thermostat and control switch assembly, taken substantially on the line 3—3 of Figure 1 and looking in the direction of arrows.
Figure 4 is a detailed sectional view taken substantially on the line 4—4 of Figure 3 and looking in the direction of the arrows.
Figure 6 is detailed section taken substantially on the line 6—6 of Figure 3 and looking in the direction of the arrows.
Figure 5:
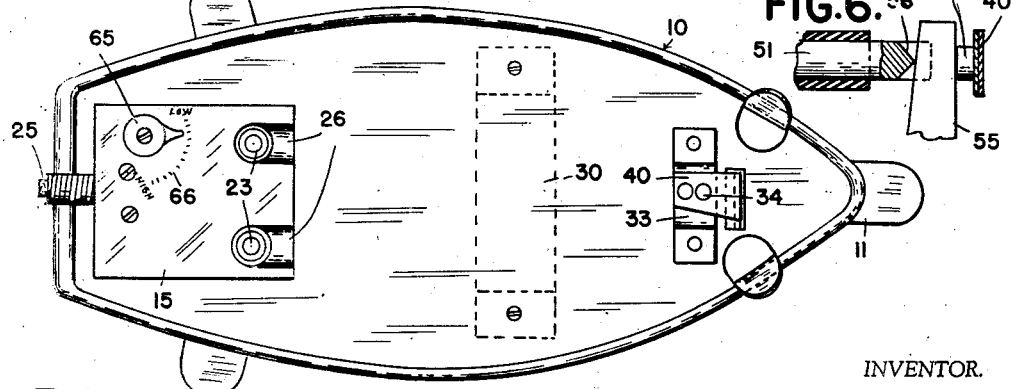
Figure 5 is a top plan view of the stand with the iron removed therefrom.

When the iron is in place upon the stand, the posts 22 and contact bars 23 may form the entire support for its back end, while at its front end the iron is supported entirely by the thermostat bracket 33 and that portion of the thermostat which overlies the same. The bracket, of relatively small size and cross section, projects upwardly from the top of the stand, the iron resting on the overlying section of the thermostat 40, as best shown in Figures 2 and 3.

Heat conduction between the thermostat and the bracket and stand is limited by the relatively restricted proportions of the metal forming the only possible heat path, and may be further limited by providing shouldered rivets as 34 for securing the thermostat to the bracket, the rivets having central spacer sections adapted to hold the body of the thermostat spaced a slight distance above the bracket. Such spacing, while advantageous, is not strictly necessary, if the areas of the thermostat and bracket which engage each other, and the proportions of the bracket, are kept small, the heat loss to and dissipation from the stand being thereby greatly restricted in any event. The top of the thermostat lies parallel to the bottom of the iron, providing a substantial area in engagement therewith at all times, in proportion to the size of the thermostat, while the active leg of the thermostat which transmits the power to the switch is bent down at right angles thereto, and passes freely through an opening as 41 in the stand.

The switch, constructed in accordance with the principles disclosed in my copending applications Serial No. 23,616, and Serial No. 157,973, is responsive to slight travel of its actuating plunger 50, and snaps from closed to opened position with a very quick-breaking action. An extension plunger as 51 is slidable in a tubular casing 52 carried by the switch body and serves when pressed inwardly by the thermostat to act upon the plunger 50 and cause the switch to open, while when pressure upon the plunger is relieved, the switch closes, the switch blade 53 serving as its own spring and normally maintaining the circuit closed, so that current is supplied to the iron as soon as the latter is placed in position upon the stand.

To control the temperature setting at which the switch is actuated, a laterally slidable regulating cam 55 is arranged between the end of the thermostat and the plunger 51. The cam is pivoted to its actuating arm 57 so that it may float or drift freely with movement of the thermostat and plunger, the thrust of the thermostat being transmitted to the plunger through the cam. It will be apparent that since the cam is of tapering width, when its wider portions are interposed between the actuating pad 42, carried by the end of the thermostat, and the plunger, lesser travel of the thermostat is required to operate the switch than is necessary when the cam is pulled out so that only a narrower portion thereof lies between the thermostat and the plunger. The cam is formed of sheet metal, and may be guided in a slot 56 in the end of plunger 51. Its actuating lever 57 is swingable about the pivot pin 58 by which it is attached to the body of the stand, and extends to a point near the back of the stand beneath the contact block 15, where it is slotted, as at 58, to receive a crank pin 59 carried by sheet metal crank 16. The crank is secured to the lower end of a shaft 62, extending upwardly through the contact block and actuable by a control knob 65 mounted on top thereof. The knob may be provided with a pointer adapted to travel over an indicator scale inscribed on top of the block.

The switch 30 will be seen to be rigidly secured to the under side of the stand, as by means of a sheet metal bracket 70 bolted to the under side thereof. The bracket may be provided with slots as 71 to receive the bolts by which it is secured to the stand, allowing initial factory or service adjustment of the switch toward and from the thermostat, although this setting, after being made initially, is normally permanent. The central portion of the bracket is also spaced sufficiently from the bottom of the stand to allow the lever 57, which lies flush thereagainst, to swing in the space between the switch bracket and the stand.

What I claim is:

1. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device comprising a warp-type thermostat element, said thermostat having a portion upon which the heatable element is adapted to rest, means for supporting said portion of the thermostat from beneath in spaced position above the stand, in such manner that any weight of the heatable device imposed upon such thermostat portion is transmitted directly therethrough to the supporting means and without material distorting effect upon another portion of the thermostat, said first mentioned portion of the thermostat forming at least a part of the supporting means for said device and holding the same spaced above the body of the stand in such manner that heat from said device must pass through the thermostat before reaching the stand, and a switch controllable by the unaffected portion of the thermostat for governing the flow of current to said contacts.

2. Means as set forth in claim 1 in which said first mentioned thermostat portion is fixedly secured to the stand, and said switch is also fixedly secured with respect to the stand, said unaffected portion of the thermostat being free to warp under temperature changes of the heatable device, and means for transmitting power from the thermostat to the switch, comprising a floating member movable with the free portion of the thermostat and adjustable to vary the extent of travel of the thermostat required to actuate the switch.

3. Apparatus as set forth in claim 1 in which said first mentioned thermostat portion and switch are both fixed with relation to the stand, said unaffected portion of the thermostat including a part free to warp under temperature changes of the heatable device, and means for transmitting power from the free portion of the thermostat to the switch, comprising a connecting member movable with the warping action of the thermostat and adjustable in another direction to vary the effective length of the connection between the thermostat and switch.

4. Means as set forth in claim 1 in which said first mentioned portion of thermostat and the switch are fixed with relation to the stand, said unaffected portion of the thermostat including a part free to warp in response to changes of temperature of the heatable device, means limiting heat conduction between said free part of the thermostat and the stand, and means for transmitting motion of said free portion of the thermostat to the switch to actuate the latter, comprising a drifting connecting member having an inclined portion movable laterally to adjust the relative length of the connection it provides between the thermostat and switch.

5. In combination with a stand and an electrically heatable device adapted to be rested upon the stand during energization and having contacts adapted for detachable engagement with cooperating current supplying contacts carried by the stand, current controlling means carried by the stand and responsive to the temperature of the heatable device comprising a warp-type thermostat element, means for supporting a portion of said thermostat element from beneath, above the stand, adapted to bear in compression at least a part of the weight of said device, whereby said device is held spaced above the body of the stand in intimate heat conductive communication with said portion of the thermostat, said means for supporting the thermostat including means restricting heat transfer between the thermostat and stand, another portion of the thermostat projecting freely from said part supported portion and being free to warp, and switching means for controlling the flow of current to the heatable device operable in response to movement of said free portion of the thermostat.

6. Means as set forth in claim 5 in which said free portion of the thermostat projects angularly away from the heatable device and back toward the stand, said portion of the thermostat supported from beneath being subjected to compression by the weight of the heatable device, and the remainder of the thermostat being unaffected by the weight of the device.

7. Thermally affected means for controlling desired apparatus incorporating heatable portions, comprising a support for a heatable portion of the apparatus, a warp-type thermostat, means for supporting the thermostat upon said support and for restricting heat communication between the thermostat and the support, said heatable portions being engageable with the supported portions of the thermostat and being held away from the support thereby, said thermostat also having another portion extending away from said heatable portions and free to warp.

8. Means as set forth in claim 7 in which said supported portion of the thermostat is backed by the support to prevent warping thereof, and the free portion thereof is unaffected by the weight of the heatable device.

9. Means as set forth in claim 7 in which said supported portion of the thermostat is backed from beneath against warping and serves to support the heatable portions, the portion free to warp being unaffected by the weight of the heatable device and extending angularly away from the secured portion.

RALPH H. BEACH.